United States Patent

Yokota et al.

[11] Patent Number: 5,721,408
[45] Date of Patent: Feb. 24, 1998

[54] ELECTRICAL CONNECTOR USED WITH STEERING WHEEL OF AUTOMOBILE

[75] Inventors: Seiichi Yokota; Keizou Suzuki, both of Aichi-ken, Japan

[73] Assignee: Kabushiki Kaisha Tokai Rika Denki Seisakusho, Aichi-ken, Japan

[21] Appl. No.: 505,899

[22] Filed: Jul. 24, 1995

[30] Foreign Application Priority Data

Jul. 25, 1994 [JP] Japan .................................. 6-172239

[51] Int. Cl.$^6$ .................................................. H01R 39/02
[52] U.S. Cl. ................................... 200/61.54; 439/164
[58] Field of Search ........................ 200/61.54, 61.55, 200/61.56, 61.31, 61.33, 61.27, 61.35, 61.34, 61.3; 439/4, 11, 13, 15, 34, 164, 492

[56] References Cited

U.S. PATENT DOCUMENTS

| | | | |
|---|---|---|---|
| 4,422,699 | 12/1983 | Sakurai et al. | 339/35 |
| 4,840,078 | 6/1989 | Shitanoki | 74/484 R |
| 4,936,782 | 6/1990 | Bannai et al. | 439/15 |
| 5,046,951 | 9/1991 | Suzuki | 439/15 |
| 5,304,071 | 4/1994 | Bannai et al. | 439/164 |
| 5,358,410 | 10/1994 | Kieserling et al. | 439/164 |
| 5,409,389 | 4/1995 | Shibata et al. | 439/164 |
| 5,460,535 | 10/1995 | Bolen | 439/164 |
| 5,529,505 | 6/1996 | Kuramoto et al. | 439/164 |

FOREIGN PATENT DOCUMENTS

| | | | |
|---|---|---|---|
| 0186935 | 7/1986 | European Pat. Off. | B60R 16/02 |
| 0437642 | 7/1991 | European Pat. Off. | H01R 39/69 |
| 2-149342 | 12/1990 | Japan | B60R 16/02 |
| 4-11541 | 1/1992 | Japan | B60R 16/02 |
| 4-11566 | 1/1992 | Japan | B62D 1/04 |
| 4-169358 | 6/1992 | Japan | B60R 21/32 |
| 5-170046 | 7/1993 | Japan | B60R 2/32 |

*Primary Examiner*—Michael L. Gellner
*Assistant Examiner*—Michael A. Friedhofer
*Attorney, Agent, or Firm*—Birch, Stewart, Kolasch & Birch, LLP

[57] ABSTRACT

A mechanism, used with a steering wheel of an automobile, which includes a first casing part mounted on the steering wheel and a second casing part, mounted on a combination switch of the automobile, that rotatably engages with the first casing part to form a casing body of an electrical connector for housing a length of a flat cable wound around inside. The casing body is assembled from fewer assembling parts and does not need a difficult process to connect itself to a combination switch of the steering wheel. The first casing part is integrally formed with a lower cover of the steering wheel, and there is provided a locking mechanism between the second casing part and the combination switch to prevent a relative rotation between the second casing part and the combination switch.

4 Claims, 6 Drawing Sheets

ELECTRICAL CONNECTOR USED WITH STEERING WHEEL OF AUTOMOBILE

BACKGROUND OF THE INVENTION

1. Field of the Invention

The present invention relates to an electrical connector used with a steering wheel of an automobile, and particularly relates to a type of electrical connector, built up from one counterpart of a casing body, for housing a length of a flat cable wound around spirally therein, mounted on a combination switch of the automobile and the other counterpart thereof mounted on the steering wheel.

2. Description of the Related Art

Conventionally, there has been provided a type of an electrical connector used with a steering wheel of an automobile as shown in FIG. 9. The type of electrical connector 50 has a first casing part 52 of a casing body, for housing a length of a flat cable wound around in it, mounted on the steering wheel 58 and a second casing part 51 thereof mounted on a combination switch of the automobile; and the first casing part 52 of the casing body has an annular top plate 55 and an inner cylindrical wall 56 integrated with the annular top plate 55 while the second casing part 51 has an annular bottom plate 53 and an outer cylindrical wall 54. The figure illustrates a condition in which the electrical connector is mounted on a mechanism of the steering wheel of the automobile.

As shown in the figure, the second casing part 51 has a flange 54a extending radially inwardly from an edge of the outer cylindrical wall 54, and the first casing part 52 is sandwiched between the flange 54a and the annular bottom plate 53 so that the axial movement of the first casing part 52 relative to the second casing part 51 is prevented while the first casing part 52 is allowed to rotate relative to the second casing part 51. In this connection, instead of constructing the electrical connector so that the first casing part 52 is formed from one member while the second casing part 51 is formed from two members as mentioned above, the electrical connecter may be constructed so that the first casing part 52 is formed from two members while the second casing member 51 is formed from one member.

In the figure, a reference numeral 57 indicates a combination switch, for the steering wheel, which is fixed to a steering column (not shown in the figure) of the automobile, and the annular bottom plate 53 of the second casing part 51 is fixed to the combination switch 57 by means of three or four screws (not shown in the figure). With this mechanism, when the steering wheel 58 is fixed to a steering shaft (not shown in the figure), the first casing part 52 is engaged fixedly with the steering wheel 58 to allow the first casing part 52 to rotate together with the steering shaft.

Although not shown in the figure, the above engaging or locking means to fix the first casing part 52 with respect to the steering wheel 58 is comprised of, for example, a hole or holes made in the steering wheel 58, and a pin or pins, which engage(s) with the hole, mounted on the first casing part 52.

According to the mechanism of the electric connector, there is a need of assembling or building the connector from three pieces of parts, which are the annular bottom plate 53, the outer cylindrical wall 54, and the first casing part 52 made of the annular top plate 55 and the inner cylindrical wall 56), and a step to fix the electrical connector 50 to the combination switch 57 for the steering wheel 58 is required. In other words, if it is possible to build the electric connector from parts fewer than three in number, and if the step to fix the electrical connector to the combination switch is unnecessary at time of assembling the electric connector, the assembling process can be simplified, thus realizing a lower manufacturing cost.

SUMMARY OF THE INVENTION

Therefore, one object of the present invention is to provide an electrical connector used with a steering wheel of an automobile, which does not require a difficult process to fix the electrical connector to the combination switch of the steering wheel.

Another object of the present invention is to provide an electrical connector used with a steering wheel of an automobile, which not only realizes the above one object of the present invention, but also is built up from fewer parts or members required for assembling the electrical connector than the conventional one.

In accomplishing these and other objects of the present invention, there is provided an electrical connector used with a steering wheel of an automobile, comprising: a first casing part mounted on a combination switch housing of the automobile; and a second casing part mounted on a side of a rotor of the steering wheel, which rotatably engages with the first casing part to form a doughnut-shaped space inside for accommodating a flat cable in a form of a scroll therein, with one end of the flat cable being electrically connected outside the first casing part and the other end thereof being electrically connected outside the second casing part, the first casing part having an annular bottom plate located on a side of the combination switch, and selectively having one of an inner cylindrical wall, fixed to a radially inward peripheral edge of the annular bottom plate and an outer cylindrical wall fixed to a radially outward peripheral edge of the annular bottom plate, the second casing part having an annular top plate located on a side of the steering wheel, and selectively having the other of the outer cylindrical wall fixed to a radially outward peripheral edge of the top plate and the inner cylindrical wall fixed to a radially inward peripheral edge of the top plate, the second casing part being fixed to a lower cover of the steering wheel, and there being provided a locking mechanism, between the first casing part and the combination switch, to prevent a relative rotation between the first casing part and the combination switch.

Preferably, the locking mechanism comprises a projection which is provided on one of the first casing part and the combination switch housing, and a hole, which is provided in the other thereof, for receiving the projection.

According to this mechanism, when the steering wheel provided with the electrical connector is connected to the steering shaft, the locking mechanism, constructed between the first casing part and the combination switch housing, functions to prevent the first casing part from being rotated with respect to the combination switch housing. Therefore, the second casing part can rotate together with the steering wheel with the first casing part being fixed to the combination switch housing.

With this mechanism, because there is no need of a difficult process to fix the first casing part to the combination switch housing, the simplification of the assembling process makes it possible to reduce the manufacturing cost significantly.

Meanwhile, in order to realize the abovementioned another object of the present invention, in addition to the above mechanism, the electrical connector is constructed as follows. That is, the second casing part has the annular top plate and the outer cylindrical wall, while the lower cover of the steering wheel is integrally formed with at least one of the annular top plate and the outer cylindrical wall. Or, the second casing part has the annular top plate and the inner cylindrical wall, the lower cover of the steering wheel is integrally formed with at least one of the annular top plate and the inner cylindrical wall.

According to this mechanism, the electrical connector is automatically built in the steering wheel, when the first casing part is connected to the second casing part.

With this mechanism, because the lower cover of the steering wheel is integrally formed with at least one of the annular top plate and the outer cylindrical wall or is integrally formed with at least one of the annular top plate and the inner cylindrical wall, the electrical connector is built from fewer assembling parts or members, thus realizing a lower manufacturing cost.

BRIEF DESCRIPTION OF THE DRAWINGS

These and other objects and features of the present invention will become clear from the following description taken in conjunction with the preferred embodiments thereof with reference to the accompanying drawings throughout which like or similar parts are designated by like reference numerals, and in which.

DETAILED DESCRIPTION OF THE PREFERRED EMBODIMENTS

Referring to FIGS. 1 to 8, a full description is made below upon an electrical connector, used with a steering wheel of an automobile, according to a first, second, third and fourth embodiments of the present invention.

First, referring to FIGS. 1 and 2, an electrical connector, used with a steering wheel of an automobile, according to the first embodiment is described below.

Figure 1:
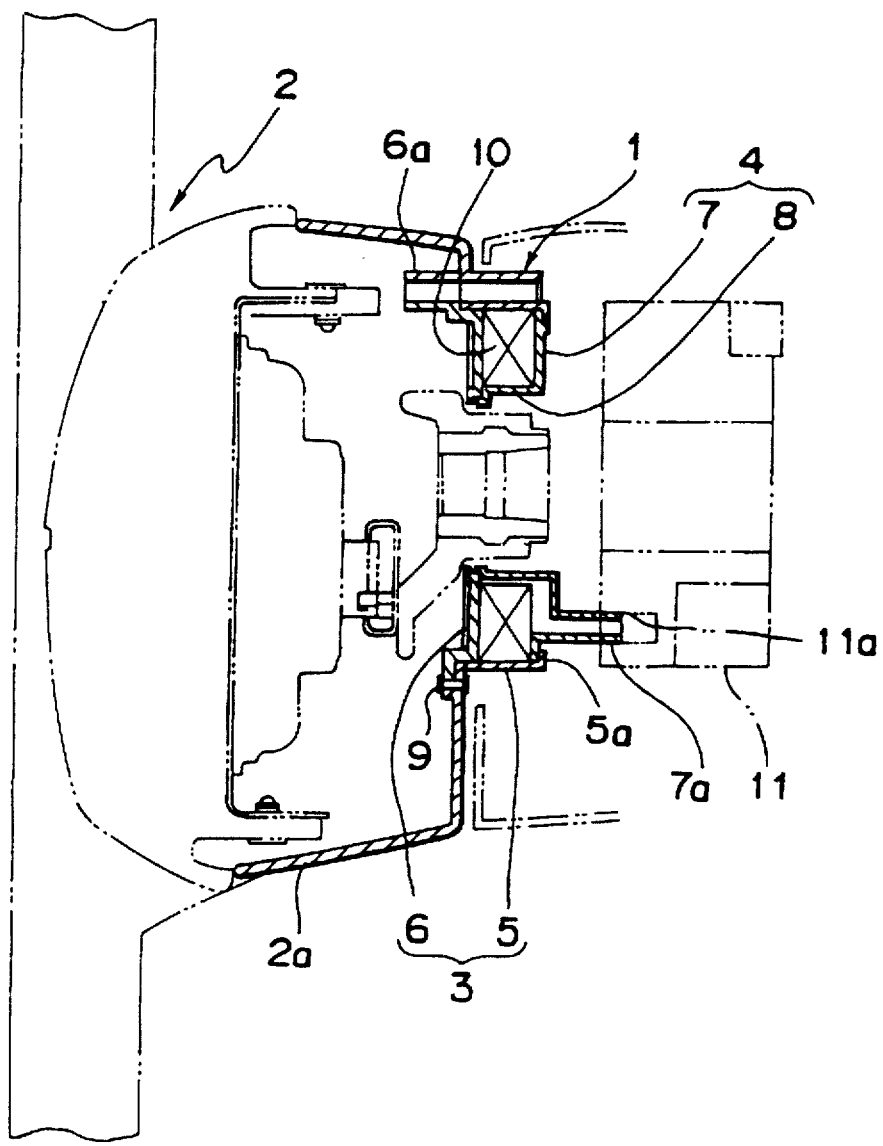
FIG. 1 is a sectional view of an electrical connector, according to a first embodiment of the present invention, used with a steering wheel of an automobile, showing a state in which the electrical connector is mounted on a steering mechanism of the automobile.
Figure 2:
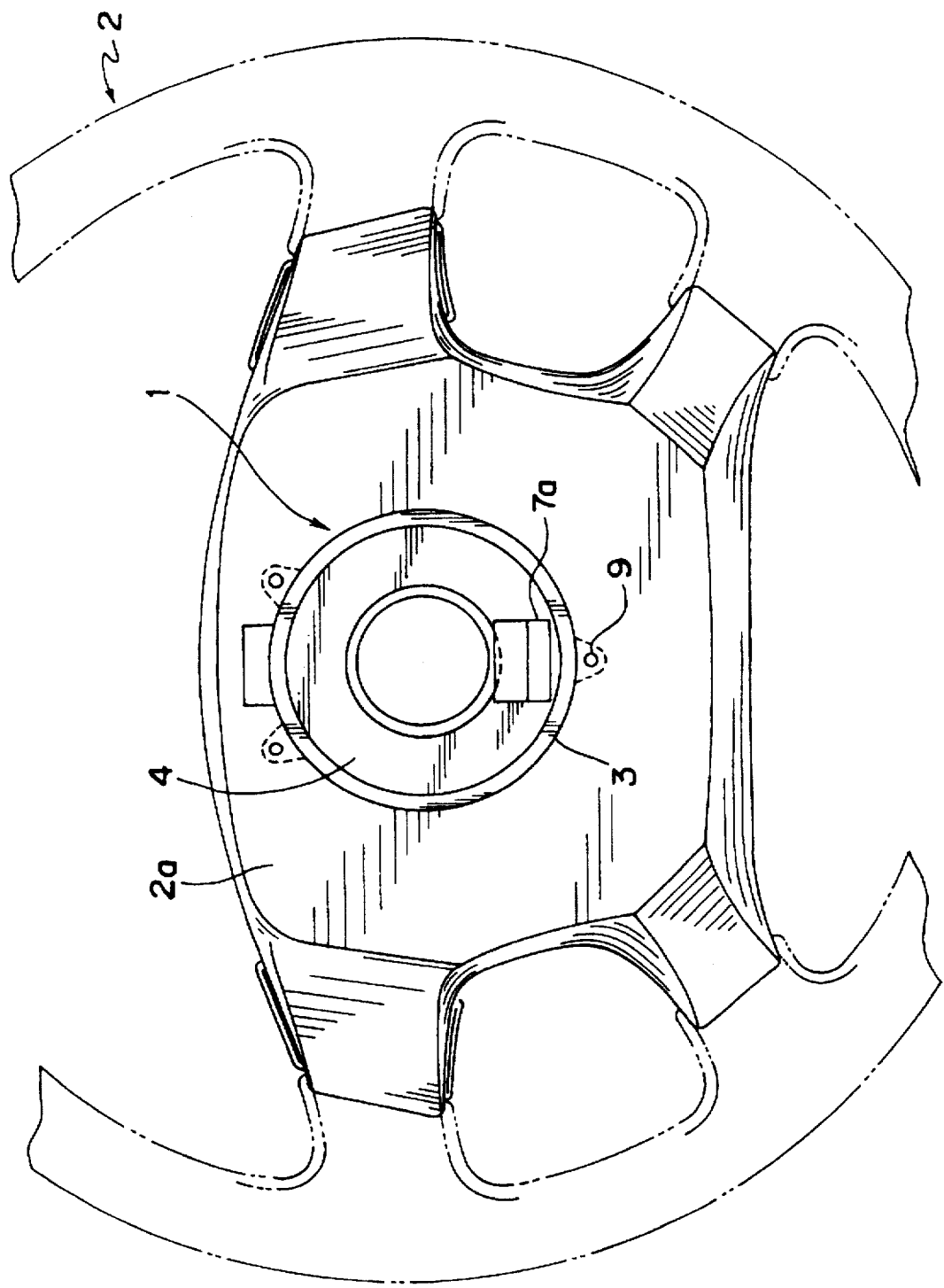
FIG. 2 is an elevation viewed from a right side of FIG. 1.

FIG. 1 illustrates a state, as a partly cross section, in which the electrical connector 1 used with the steering wheel 2 of the automobile is mounted on a steering mechanism of the automobile; and FIG. 2 illustrates the connecting state of the electrical connector 1 to the steering mechanism, from a right side of FIG. 1.

As shown in the figure, the electrical connector 1 is installed inside the steering wheel 2, and a casing body of the electrical connector 1 comprises a first casing part 3 mounted on the steering wheel 2, and a second casing part 4 mounted on a combination switch 11 of the automobile. The first casing part 3 comprises two building parts, which are an outer cylindrical wall 5 and an annular top plate 6, and the outer cylindrical wall 5 is integrated with a lower cover 2a of the steering cover 2. The annular top plate 6 is fixed to the lower cover 2a by caulking a pin 9 whose ends sandwich both the annular top plate 6 and the lower cover 2a of the steering wheel 2. As best shown in FIG. 2, the lower cover 2a of the steering wheel 2 covers a central part of the steering wheel 2 and covers four spokes of the steering wheel 2.

Meanwhile, the second casing part 4 comprises an annular bottom plate 7 and an inner cylindrical wall 8 integrated with the annular bottom plate 7.

The outer cylindrical wall 5 of the first casing part 3 has an edge with a flange 5a extending radially inwardly, and the second casing part 4 is sandwiched between the flange 5a and the annular top plate 6 of the first casing part 3.

With this construction, the first casing member 3 is prevented from moving in an axial direction of the electrical connector 1.

The annular bottom plate 7 of the second casing part 4 comprises a first connecting part 7a for external wiring, projecting towards a combination switch housing 11 shown by the imaginary line in the figure, which allows a length of a flat cable 10 housed inside the casing body to be electrically connected outside thereof.

On the other hand, the combination switch housing 11 comprises a hollow part 11a with which the first connecting part 7a of the annular bottom plate 7 of the second casing part is fixedly engaged. When the first connecting part 7a is engaged with the hollow part 11a of the combination switch 11, both the first connecting part 7a and the hollow part 11a function as a stopper to prevent a rotation of the second casing part 4 with respect to the combination switch housing 11. As shown in the figure, the annular top plate 6 of the first casing part 3 has also a second connecting part 6a for external wiring through which the flat cable 10 is electrically connected outside the first casing part 3.

According to the electrical connector of the embodiment, because the lower cover 2a of the steering wheel 2 is integrated with the outer cylindrical wall 5 of the first casing part 3, when the first casing part 3 is connected to the second casing part 4, the electrical connector 1 is installed as what is built in the steering wheel 2. And when the steering wheel 2 in which the electrical connector 1 is provided is fixed to a steering shaft (not shown in the figure), the first casing part 3 can be rotated together with the steering wheel 2, because the first connecting part 7a of the second casing part 4 and the hollow part 11a of the combination switch housing 11 serve as a stopper to prevent a mutual rotation between the second casing part 4 and the combination switch 11, by fixing the second casing part 4 in position with respect to the combination switch 11.

In addition, according to the electrical connector of the embodiment, not only because the lower cover 2a of the steering wheel 2 is integrally formed with the outer cylindrical wall 5 of the first casing part 3 in order to significantly reduce the number of parts or members necessary for assembling the electrical connector 1, but also because a difficult step for fixing the second casing part 4 to the combination switch 11 is not required, a lower manufacturing cost can be realized.

Figure 3:
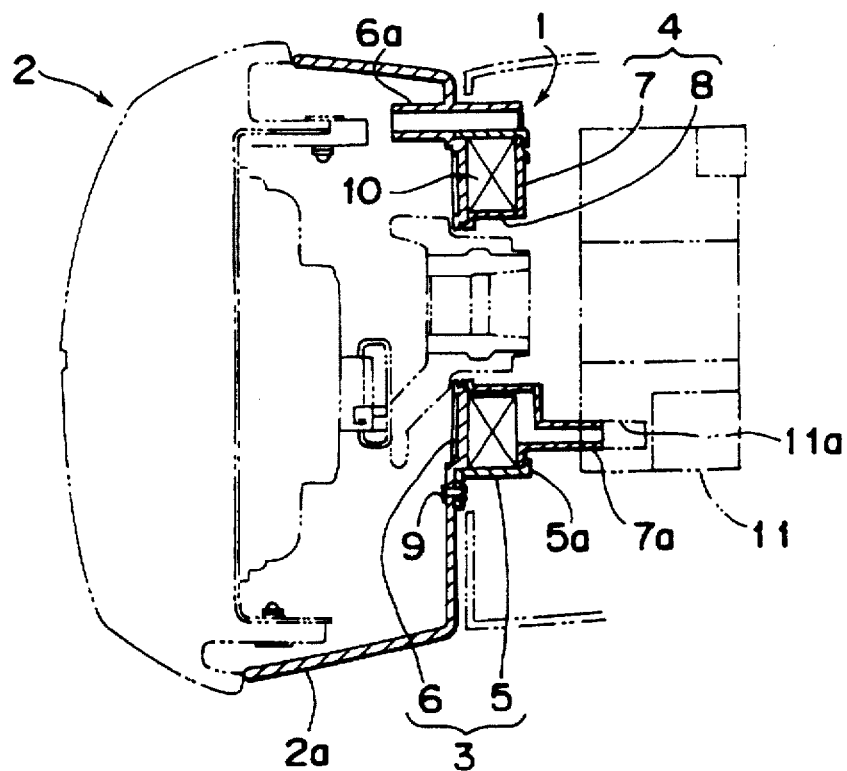
FIG. 3 is a sectional view of an electrical connector, according to a second embodiment of the present invention, similar to FIG. 1.
Figure 4:
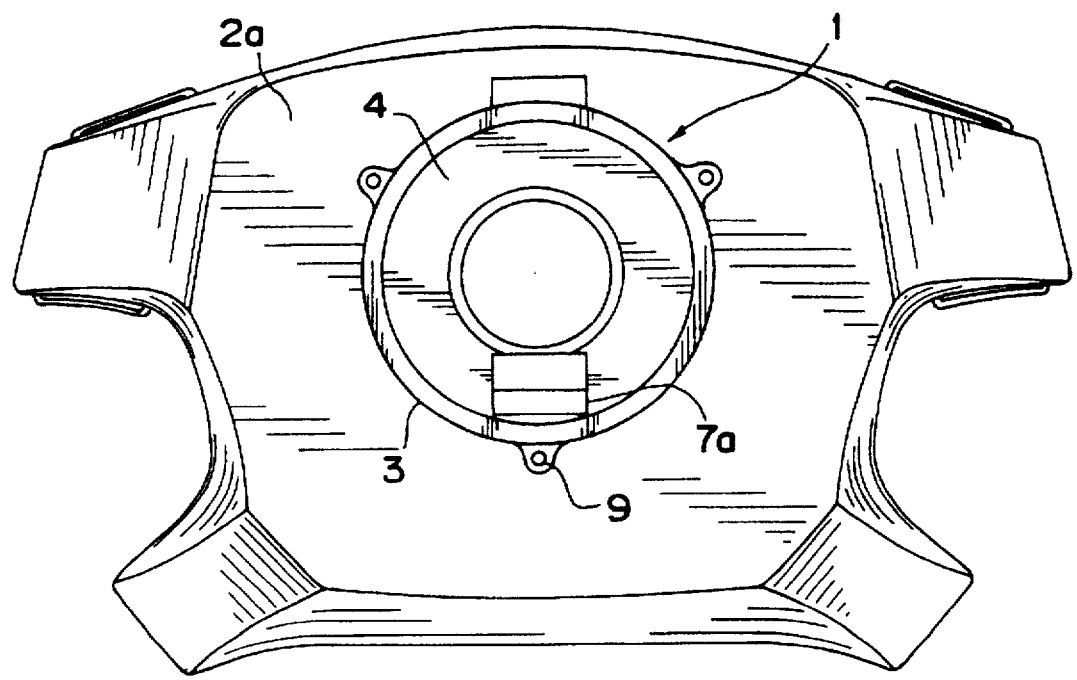
FIG. 4 is an end elevation viewed from a right side of the FIG. 3.

Next, referring to FIGS. 3 and 4, an electrical connector, used with a steering wheel of an automobile, according to the second embodiment is described below.

The electrical connector 1 of the second embodiment has a fundamental construction similar to that of the first embodiment in that the electrical connector 1 of the second embodiment comprises a first casing part 3 mounted on the steering wheel 2 and a second casing part 4 mounted on a combination switch housing 11; and the first casing part 3 comprises an outer cylindrical wall 5 and an annular top plate 6 while the second casing part 4 comprises an annular bottom plate 7 and an inner cylindrical wall 8.

Different from the first embodiment, a lower cover 2a of a steering wheel 2 is integrated with the annular top plate 6, and the outer cylindrical wall 5 is fixed to the lower cover 2a by caulking a pin 9 whose ends sandwich the lower cover 2a and the outer cylindrical wall 5.

With this construction, similar to the first embodiment, a low manufacturing cost can be realized by the reduction of the number of parts or members required for assembling the electrical connector and by the simplification of the step or work for fixing the second casing part 4 to the combination switch 11.

Figure 5:
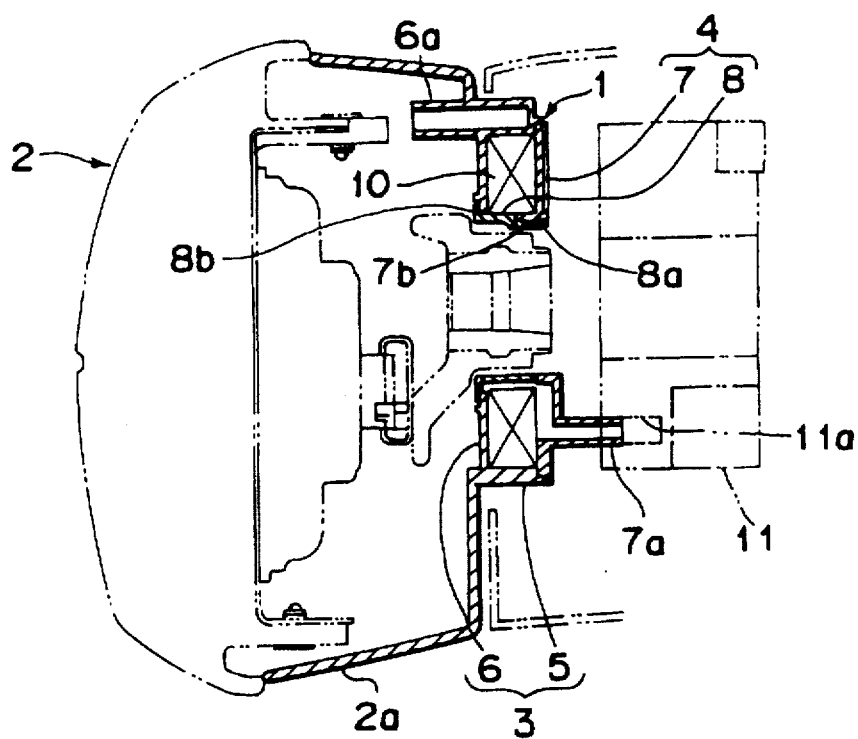
FIG. 5 is a sectional view of an electrical connector, according to a third embodiment of the present invention, similar to FIG. 1.
Figure 6:
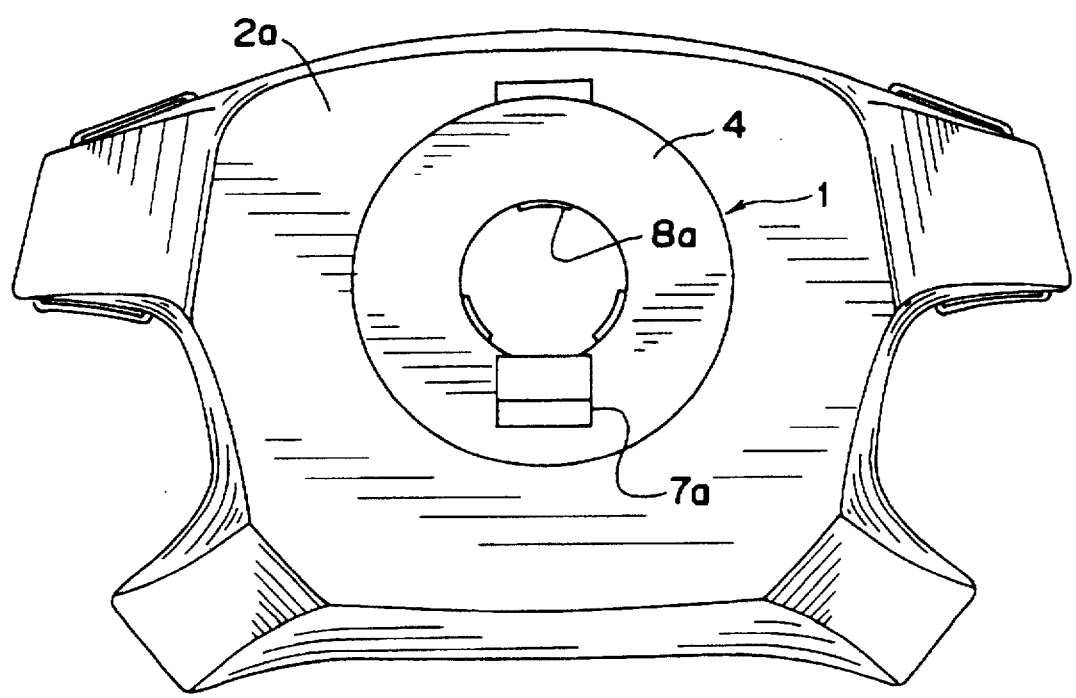
FIG. 6 is an end elevation viewed from a right side of the FIG. 5.

Next, referring to FIGS. 5 and 6, an electrical connector, used with a steering wheel of an automobile, according to the third embodiment is described below.

The electrical connector 1 of the third embodiment has a fundamental construction similar to those of the first and second embodiments. Different from the first and second embodiments, both an outer cylindrical wall 5 and an annular top plate 6 are integrated with a lower cover 2a of a steering wheel 2, while a second casing part 4 comprises two parts, which are an annular bottom plate 7 and an inner cylindrical wall 8.

The annular bottom plate 7 of the second casing part 4 comprises a plurality of engaging claws 7b, for example, three engaging claws 7b, disposed evenly around an inner peripheral edge part of the annular bottom plate 7, while the inner cylindrical wall 8 of the second casing member 4 comprises a plurality of engaging holes or concave parts 8a, for example, three engaging holes or concave parts 8a, with which the engaging claws 7b of the annular bottom plate 7 are fixedly engaged.

The inner cylindrical wall 8 of the second casing part 4 has a flange 8b at an edge thereof projecting radially outwardly, and the first casing part 3 is sandwiched between the flange 8b and the annular bottom plate 7 of the second casing part 4. It is not explained here about the constructions of the first and second connecting parts 6a and 7a for external wiring as well as other parts, because they are the same as the ones of the first embodiment.

In the third embodiment, the lower cover 2a of the steering wheel 2, the outer cylindrical wall 5, and the annular top plate 6 are integrated with each other, so that not only the reduction in number of the building parts or members required for the electrical connector, but also the simplification of the step or process to connect the assembling parts to each other can be realized, as well as the first and second embodiments.

Figure 7:
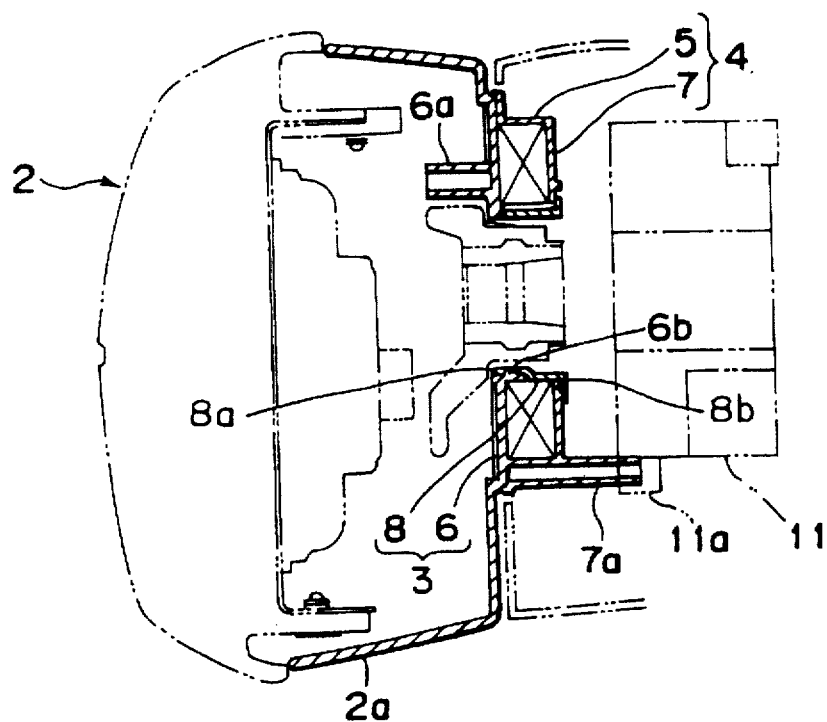
FIG. 7 is a sectional view of an electrical connector, according to a fourth embodiment of the present invention, similar to FIG. 1.
Figure 8:
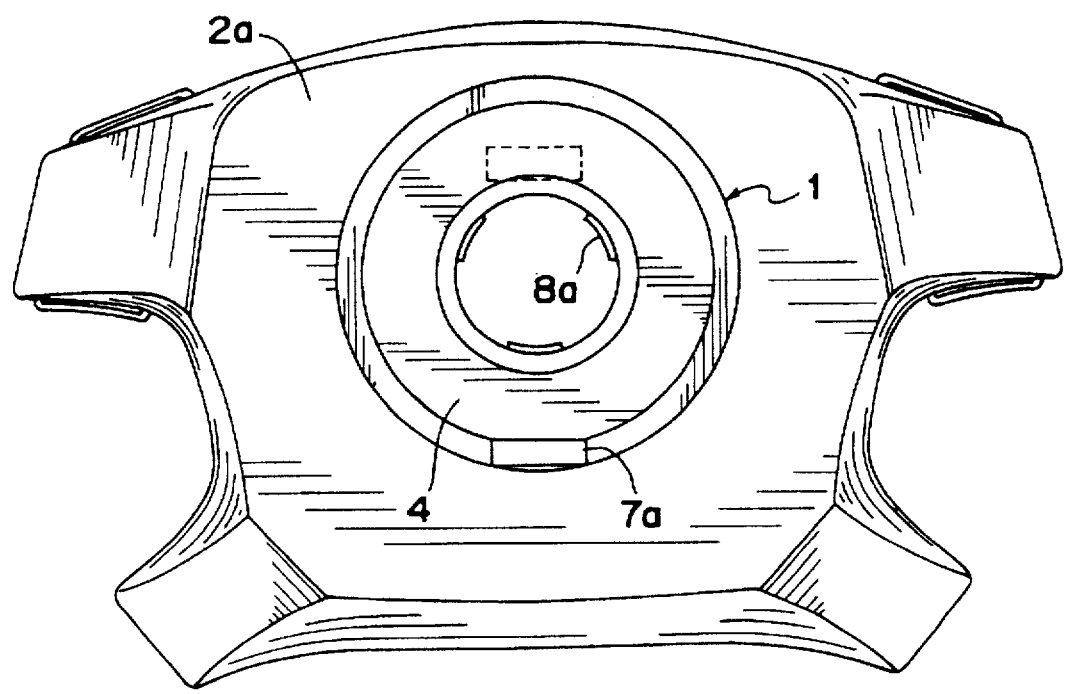
FIG. 8 is an end elevation viewed from a right side of the FIG. 7.
Figure 9:
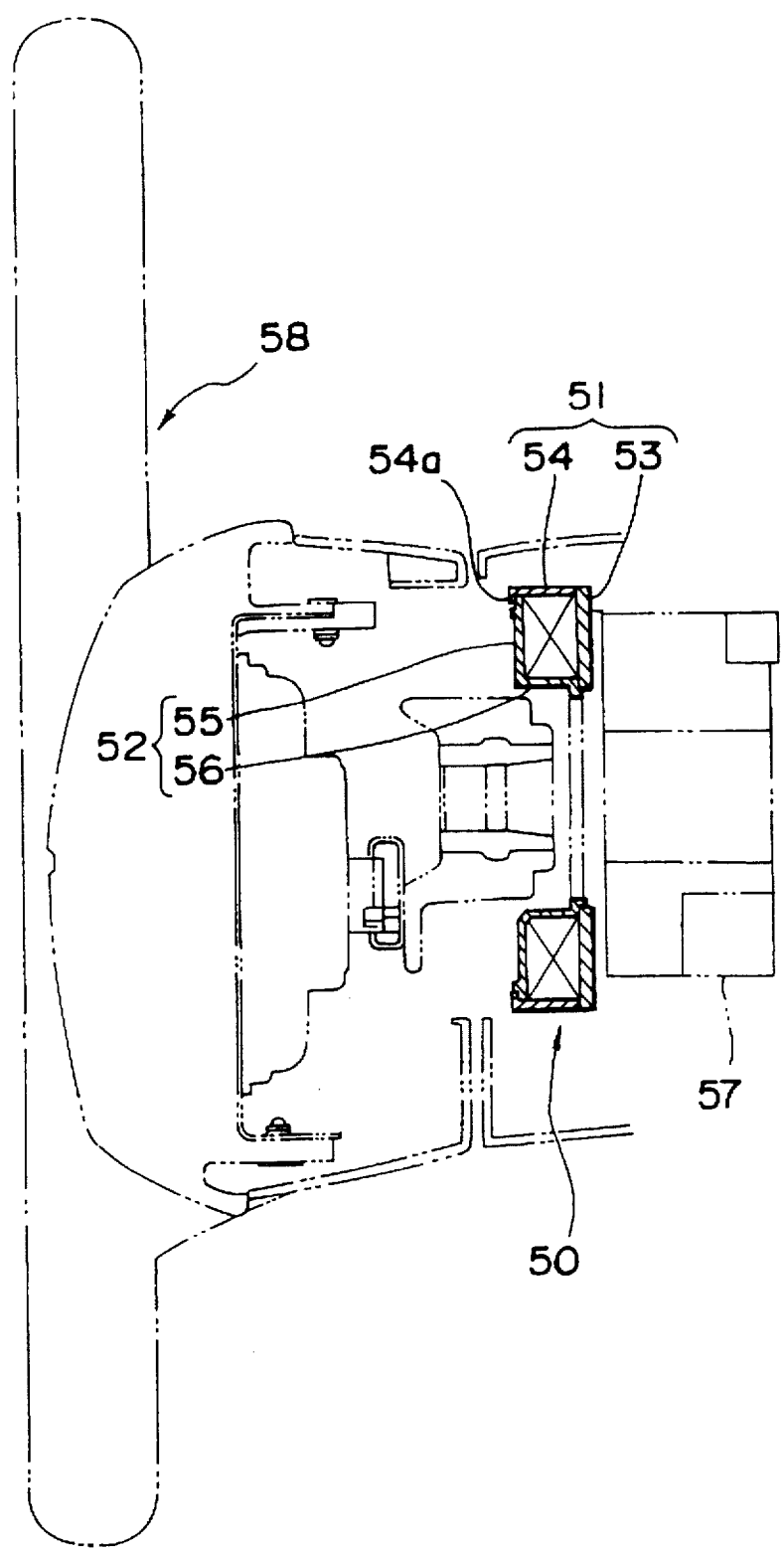
FIG. 9 is a sectional view of an electrical connector, according to a prior art, used with a steering wheel of an automobile, showing a state in which the electrical connector is mounted on a steering mechanism of the automobile.

Next, referring to FIGS. 7 and 8, an electrical connector, used with a steering wheel of an automobile, according to the fourth embodiment is described below.

A first casing part 3 mounted on a steering wheel 2 comprises an annular top plate 6 integrated with a lower cover 2a of the steering wheel 2, and an inner cylindrical wall 8 which is connected to the annular top plate 6. The annular top plate 6 has a plurality of engaging claws 6b, for example, three engaging claws 6b, disposed evenly around an inner peripheral edge part of the annular top plate 6, while an inner cylindrical wall 8 comprises a plurality of engaging holes or concave parts 8a, for example, three engaging holes or concave parts 8a, with which the engaging claws 6b are fixedly engaged. The inner cylindrical wall 8 has a flange 8b, at an edge part thereof, extending radially outwardly. A second casing part 4, which is mounted on a combination switch 11 and which comprises an outer cylindrical wall 5 and an annular bottom plate 7 integrated with the outer cylindrical wall 5, is rotatably supported, relative to the first casing part 3, between the flange 8b and the annular top plate 6 of the first casing part 3 so that the second casing member 4 is prevented from moving in an axial direction of the electrical connector.

In the fourth embodiment, the lower cover 2a of the steering wheel 2 is integrated with the annular top plate 6 of the first casing member 3, so that the reduction in number of the parts required for assembling the electrical connector, and the simplification of the process or work to connect the parts to each other can be realized, as in the first, second and third embodiments.

Although the present invention has been fully described in connection with the preferred embodiments thereof with reference to the accompanying drawings, it is to be noted that various changes and modifications are apparent to those skilled in the art.

For example, instead of providing the second casing part 4 with the first connecting part 7a, and instead of providing the combination switch 11 with the hollow part 11a, a projection corresponding to the first connecting part 7a, and a hole corresponding to the hollow part 11a may be provided on the combination switch 11 and the second casing part 4, respectively.

Such changes and modifications are to be understood as included within the scope of the present invention as defined by the appended claims unless they depart therefrom.

What is claimed is:

1. A motor vehicle steering wheel electrical connector assembly, comprising:

a steering wheel mechanism including a lower cover;

a first casing part mounted on a housing of a combination switch of the automobile;

a locking mechanism between the first casing part and the combination switch to prevent a relative movement therebetween; and a second casing part, which rotatably engages with the first casing part to form a doughnut-shaped space inside for accommodating a flat cable in a form of a scroll therein, with one of opposite ends of the flat cable being electrically connected outside the first casing part and the other of the opposite ends thereof being electrically connected outside the second casing part, wherein the first casing part has an annular bottom plate disposed on a side of the combination switch, and has an inner cylindrical wall, fixed to a radially inward peripheral edge of the annular bottom plate, and the second casing part has an annular top plate disposed on a side of the steering wheel, and has an outer cylindrical wall fixed to a radially outward peripheral edge of the annular top plate, at least one of the annular top plate and the outer cylindrical wall being formed by a portion of the lower cover.

2. The assembly as claimed in claim 1, wherein the locking mechanism comprises a projection which is provided on one of the first casing part and the housing, and a hole, which is provided in the other thereof, for receiving the projection.

3. A motor vehicle steering wheel electrical connector assembly, comprising:

a steering wheel mechanism including a lower cover;

a first casing part mounted on a housing of a combination switch of the automobile;

a locking mechanism between the first casing part and the combination switch to prevent a relative movement therebetween; and a second casing part, which rotatably engages with the first casing part to form a doughnut-shaped space inside for accommodating a flat cable in a form of a scroll therein, with one of opposite ends of the flat cable being electrically connected outside the first casing part and the other of the opposite ends thereof being electrically connected outside the second casing part, wherein the first casing part has an annular bottom plate disposed on a side of the combination switch, and has an outer cylindrical wall fixed to a radially outward peripheral edge of the annular bottom plate, and the second casing part has an annular top plate disposed on a side of the steering wheel, and has an inner cylindrical wall fixed to a radially inward peripheral edge of the annular top plate, at least one of the annular top plate and the inner cylindrical wall being formed by a portion of the lower cover.

4. The electrical connector assembly as claimed in claim 3, wherein the locking mechanism comprises a projection which is provided on one of the first casing part and the housing, and a hole, which is provided in the other thereof, for receiving the projection.

* * * * *